United States Patent
Draghi et al.

[11] Patent Number: 5,972,424
[45] Date of Patent: Oct. 26, 1999

[54] REPAIR OF GAS TURBINE ENGINE COMPONENT COATED WITH A THERMAL BARRIER COATING

[75] Inventors: Peter Jon Draghi, Simsbury; Peter Wrabel, Windsor Locks, both of Conn.

[73] Assignee: United Technologies Corporation, Hartford, Conn.

[21] Appl. No.: 09/082,716

[22] Filed: May 21, 1998

[51] Int. Cl.⁶ .................................................. B32B 35/00
[52] U.S. Cl. .......................... 427/142; 427/454; 29/889.1
[58] Field of Search .................... 427/454, 142; 29/889.1

[56] References Cited

U.S. PATENT DOCUMENTS

| | | | |
|---|---|---|---|
| Re. 32,121 | 4/1986 | Gupta et al. | 428/656 |
| 3,678,570 | 7/1972 | Paulonis et al. | 29/498 |
| 4,008,844 | 2/1977 | Duvall et al. | 228/119 |
| 4,038,041 | 7/1977 | Duvall et al. | 428/576 |
| 4,073,639 | 2/1978 | Duvall et al. | 75/5 R |
| 4,078,922 | 3/1978 | Magyar et al. | 75/171 |
| 4,122,992 | 10/1978 | Duvall et al. | 228/176 |
| 4,141,127 | 2/1979 | Cretella et al. | 29/889.1 |
| 4,152,488 | 5/1979 | Schilke et al. | 428/678 |
| 4,176,433 | 12/1979 | Lee et al. | 29/889.1 |
| 4,249,913 | 2/1981 | Johnson et al. | 51/295 |
| 4,321,310 | 3/1982 | Ulion et al. | 428/612 |
| 4,321,311 | 3/1982 | Strangman | 428/623 |
| 4,401,697 | 8/1983 | Strangman | 427/250 |
| 4,405,659 | 9/1983 | Strangman | 427/248.1 |
| 4,405,660 | 9/1983 | Ulion et al. | 427/248.1 |
| 4,414,249 | 11/1983 | Ulion et al. | 427/248.1 |
| 4,585,481 | 4/1986 | Gupta et al. | 106/14.05 |
| 4,610,698 | 9/1986 | Eaton et al. | 51/295 |
| 4,680,199 | 7/1987 | Vontell et al. | 427/199 |
| 4,689,242 | 8/1987 | Pike | 427/34 |
| 4,735,656 | 4/1988 | Schaefer et al. | 75/238 |
| 4,741,973 | 5/1988 | Condit et al. | 428/553 |
| 4,743,462 | 5/1988 | Radzavich et al. | 427/453 |
| 4,744,725 | 5/1988 | Matarese et al. | 415/172 A |
| 4,802,828 | 2/1989 | Rutz et al. | 416/241 B |
| 5,216,808 | 6/1993 | Martus et al. | 29/889.1 |
| 5,262,245 | 11/1993 | Ulion et al. | 428/469 |
| 5,359,770 | 11/1994 | Brown et al. | 29/889.1 |
| 5,655,701 | 8/1997 | Quattrocchi et al. | 29/889.1 |
| 5,686,001 | 11/1997 | Wrabel et al. | 219/137 PS |
| 5,817,371 | 10/1998 | Gupta et al. | 427/454 |

*Primary Examiner*—Katherine A. Bareford
*Attorney, Agent, or Firm*—George J. Romanik

[57] ABSTRACT

A gas turbine engine component coated with a thermal barrier coating that includes a metallic bond coat and a ceramic top coat is repaired by removing the ceramic top coat from an engine-run gas turbine engine component and inspecting the component. A metallic flash coat is applied to at least a portion of the component. A ceramic top coat is then applied over predetermined portions of the component, including the portion to which the metallic flash coat was applied.

7 Claims, 1 Drawing Sheet

FIG.1
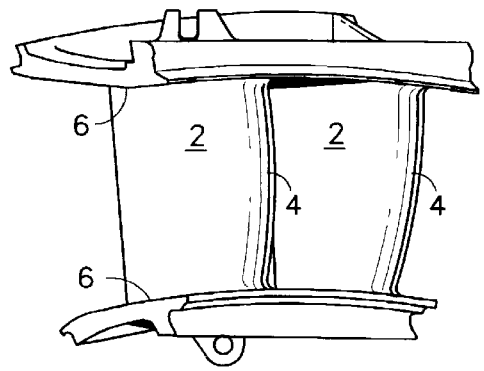
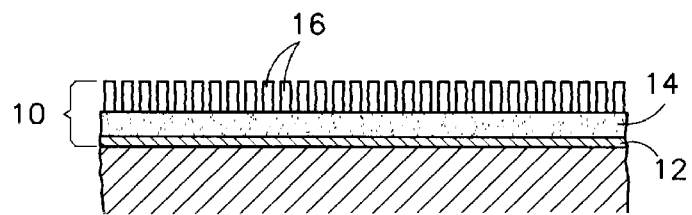
FIG.2
FIG.3
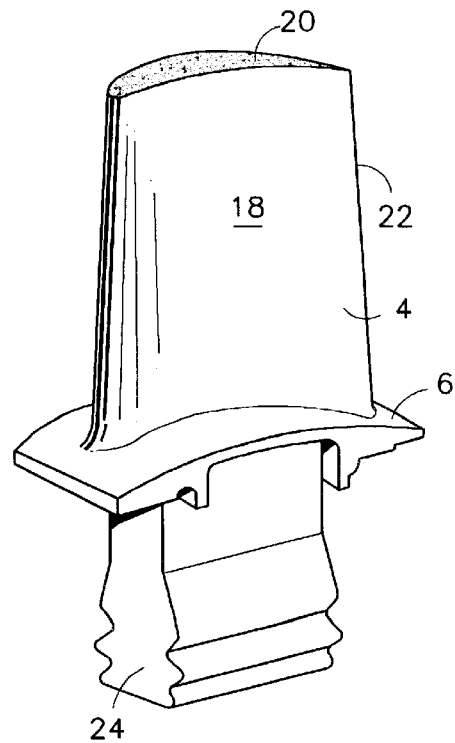

REPAIR OF GAS TURBINE ENGINE COMPONENT COATED WITH A THERMAL BARRIER COATING

TECHNICAL FIELD

The present invention is directed to repairs of gas turbine engine components coated with a thermal barrier coating.

BACKGROUND ART

Over the years, gas turbine engine manufactures have increased the temperature and pressure at which gas turbine engines operate to meet demands for more powerful and efficient engines. The increased temperatures and pressures have imposed rigorous operating conditions on certain engine parts, particularly turbine vanes and blades immediately downstream of a combustor. In modern engines, turbine vanes and blades may be exposed to temperatures near or above the melting point of the alloy from which they are made.

While manufacturers have been designing gas turbine engines that operate under very demanding conditions, they have been striving to improve gas turbine engine reliability and to extend maintenance intervals to improve the economics of operating gas turbine engines. Manufacturers have addressed both objectives by applying protective coatings to certain parts, particularly turbine vanes and blades. Initially, the coatings focused on providing oxidation and corrosion protection. Examples of these include diffusion aluminide coatings, MCrAlY coatings, where M is Ni, Co, Fe, or Ni/Co, and other metallic coatings. Commonly assigned U.S. Pat. Nos. 4,585,481 and Re 32,121, both to Gupta et al., describe such coatings. More recently, multi-layer, thermal barrier coatings that comprise an oxidation and corrosion resistant metallic bond coat and a ceramic top coat have been used. Such coatings are described in commonly assigned U.S. Pat. Nos. 4,321,310 to Ulion et al., 4,321,311 to Strangman, 4,401,697 to Strangman, 4,405,659 to Strangman, 4,405,660 to Ulion et al., 4,414,249 to Ulion et al., and 5,262,245 to Ulion et al. Thermal barrier coatings provide thermal resistance to the high temperatures in a gas turbine engine in addition to providing oxidation and corrosion resistance.

As with other gas turbine engine parts, gas turbine engine operators find it desirable to repair thermal barrier coated parts periodically to restore them to desirable conditions. An important step in repairing thermal barrier coated parts is stripping the thermal barrier coating. Both the ceramic and metallic portions of the coating are removed. The process for stripping the ceramic portion of the coating may include soaking the part in a solution of KOH for about 4 hours to about 8 hours at a pressure of about 375 psia to about 425 psia and a temperature of about 400° F. to about 450° F. The metallic portion of the coating may be stripped by soaking the part in a HCl solution for about 2 hours at atmospheric pressure and a temperature of about 140° F. to about 160° F.

Although the stripping process effectively removes the ceramic and metallic portions of the coating, it also removes a portion of the base metal under the metallic portion, thinning the exterior wall of the component. The thinner wall is acceptable as long as it meets applicable inspection criteria. To ensure that the component wall does not become too thin, a wall thickness inspection is used to determine the wall thickness remaining after stripping. Once the wall thickness becomes too thin, the part is scrapped. As a result, stripping and related blending operations limit the number of times a particular part can be repaired. Once the repair limit has been reached for a particular part, the part must be replaced with a new part, rather than being repaired.

If the part is repairable, it is routed through the rest of a repair cycle. The repair cycle may include operations such as weld repairs to fill cracks and/or restore tip dimensions, braze repairs to fill cracks and/or restore or change a vane's "class" ("class" is a measure of the amount of open area available for gas flow in an assembled gas turbine engine), tip repairs to restore abrasive tips, and other steps. Many of these operations are described in more detail in expired U.S. Pat. Nos. 4,008,844 to Duvall et al., 4,073,639 to Duvall et al., and 4,078,922 to Magyar et al. Naturally, the repair cycle also includes reapplication of both layers of the thermal barrier coating. Following repair, the parts are inspected again to determine if they are acceptable to return to service.

Although this type of repair cycle has been used successfully in many instances, it has several drawbacks. First, the use of chemical stripping can limit the number of times a particular part can be repaired. As a result, the operator may need to purchase a new part when the repair limit is reached. Second, removing and reapplying the metallic bond coat portion of the thermal barrier coating can result in cooling hole plugging (sometimes knows as "coat down"). Parts with plugged cooling holes are typically unacceptable for return to service as is and must either be reworked or discarded. Third, stripping and reapplying the coating can be expensive and time consuming. In this age of rapid turn times and "just in time" planning, the time it takes to perform a repair cycle that includes stripping and reapplication of the coating can be a major issue with some customers. In addition, coating application can generate waste material or by-products that require costly disposal.

Therefore, what is needed in the industry is a repair for gas turbine engine parts coated with a ceramic thermal barrier coating that increases the number of times a part can be repaired and is less expensive and time consuming prior art repair methods. Moreover, the repair method should not lead to the coat down phenomenon noted with prior art repair methods.

DISCLOSURE OF THE INVENTION

The present invention is directed towards a repair for gas turbine engine parts coated with a ceramic thermal barrier coating that increases the number of times a part can be repaired, is less expensive and time consuming prior art repair methods, and does not lead to the coat down phenomenon noted with prior art repair methods.

One aspect of the invention includes a method for repairing a gas turbine engine component coated with a thermal barrier coating that includes a metallic bond coat and a ceramic top coat. The ceramic top coat is removed from an engine-run gas turbine engine component and the component is inspected. A metallic flash coat is applied to at least a portion of the component and a ceramic top coat is applied over predetermined portions of the component, including the portion to which the metallic flash coat was applied.

Another aspect of the invention a method for repairing a gas turbine engine blade coated with a thermal barrier coating that includes a metallic bond coat and a ceramic top coat. The ceramic top coat is removed from an engine-run gas turbine engine component and the component is inspected. Abrasive material from a tip on the blade is removed and weld material is applied to the tip to restore it to a predetermined dimension. A metallic flash coat is applied to at least a portion of the component and abrasive material is applied to the blade tip. A ceramic top coat is applied over predetermined portions of the component, including the portion to which the metallic flash coat was applied.

These and other features and advantages of the present invention will become more apparent from the following description and accompanying drawing.

BRIEF DESCRIPTION OF THE DRAWING

FIG. 1 is a perspective view of a typical gas turbine engine high pressure turbine vane.

FIG. 2 is a view of a thermal barrier coating.

FIG. 3 is a perspective view of a typical gas turbine engine high pressure turbine blade.

BEST MODE FOR CARRYING OUT THE INVENTION

The method of the present invention may be used to repair any gas turbine engine parts that are coated with a thermal barrier coating. Typically, engine run high pressure turbine vanes and blades are candidates for the repair of the present invention, particularly if they are removed from an engine before a scheduled maintenance or display only light wear regardless of the amount of time in an engine. The amount of wear on a part can be determined by any means known in the art, including destructively testing a representative piece from a set of parts.

FIG. 1 shows a typical high pressure turbine vane 2. The vane 2 comprises an airfoil section 4 bounded by two platforms 6. A plurality of cooling holes (not shown) are positioned on the airfoil section 4 to direct relatively cool air across the vane 2 to help it withstand the high temperatures to which it is exposed. To further protect the vane 2 from high temperatures, the airfoil section 4 and platforms 6 are coated with a thermal barrier coating. As shown in FIG. 2, the thermal barrier coating 10 comprises a metallic bond coat 12 disposed over the vane 2, an aluminum oxide layer 14 on top of the bond coat 12, and a ceramic top coat 16 on top of the aluminum oxide layer 14.

FIG. 3 shows a typical high pressure turbine blade 18. The blade 18 comprises an airfoil section 4 bounded by single platform 6 and a tip 20 to which an abrasive material is bonded. A trailing edge 22 is positioned on the downstream side of the airfoil section 4. The blade 18 also includes a root 24 that is used to attach the blade 18 to a gas turbine engine. A plurality of cooling holes (not shown) are positioned on the airfoil section 4 to direct relatively cool air across the blade 18 to help it withstand the high temperatures to which it is exposed. Cooling holes also may be positioned in the platform 6 and tip 20. To further protect the blade 18 from high temperatures, the airfoil section 4 and platform 6 are coated with a thermal barrier coating.

For convenience, the method of the present invention will be described in the context of repairing a blade 18. One skilled in the art will recognize that with a few modifications, the method described below can be readily adapted to repairing a vane 2 or any other gas turbine engine part coated with a thermal barrier coating.

As know in the art, the first steps in repairing a blade 18 include removing detachable details such as metering plates, baffles, seal details, and similar parts as appropriate. Other preliminary steps may include cleaning and stress relief by any appropriate method known in the art. For example, a suitable cleaning method could include grit or sand blasting. A suitable stress relief procedure may include heating the part to between about 1950° F. to about 2000° F. in a non-oxidizing atmosphere (e.g., vacuum or argon) for about 7 minutes to about 240 minutes. If the blade 18 has an internal cavity, the cavity may be cleaned as necessary at any point during the process by any suitable method known in the art.

Following any preliminary steps, the ceramic top coat 16 and aluminum oxide layer 14 are removed from the blade 18 using any conventional method that does not also remove the metallic bond coat 12. For example, the ceramic top coat 16 and aluminum oxide layer 14 may be removed by autoclave cleaning in KOH, grit blasting the ceramic layer and oxidized coating, or any other method known in the art. An autoclave cleaning process may include soaking the part in a solution of KOH for about 4 hours to about 8 hours at a pressure of about 375 psia to about 425 psia and a temperature of about 400°F. to about 450° F.

After the ceramic top coat 16 and aluminum oxide layer 14 are removed, the blade 18 is inspected to ensure that sufficient bond coat 12 remains to perform the repair of the present invention. The amount of bond coat 12 required for the present invention may vary depending the specific part being repaired. Although it is possible that no bond coat 12 need remain, there is typically at least about 1 mils of bond coat 12 remaining when the repair of the present invention is performed. If there is insufficient bond coat 12, the blade 18 may not be repaired with the method of the present invention, but may possibly be repaired with a conventional procedure in which the bond coat 12 also is removed from the blade 18. The blade 18 also should be inspected to determine whether it meets certain minimum standards. In general, the blade 18 should satisfy relevant serviceable inspection limits. Preferably, the bond coat 12 will not have a rumpled appearance and will have no bare spots. Also, the blade 18 should not display any base metal oxidation. Moreover, it may be desirable to impose some limitations on the extent of cracking acceptable in the blade 18. For example, it may be preferable to limit cracking within 20 mils outboard of the top row holes. Selected criteria may exceed serviceability limits as long as the blade 18 may be repaired within the constraints of the present invention to return the criteria to serviceable limits. Examples of such criteria include tip 20 erosion or oxidation. Some repairs, particularly tip 20 repairs, may not even be necessary if the blades 18 will be installed in an engine with a sufficient number (e.g., more than about 25% to about 50%) new or fully repaired blades 18.

Following inspection, any residual abrasive material on the tip 20 may be removed with any conventional method, such as grinding. The blade 18 may then be inspected to determine whether the tip 20 requires repairs. Suitable inspection techniques include, but are not limited to, fluorescent penetrant inspection to determine the presence of cracks, x-ray inspection to determine the presence of cracks and tip 20 wall thickness, and any other appropriate conventional method. Indications or distress modes that should be repaired may vary depending on the type of part repaired and the engine from which it comes. It may be desirable to remove cracks found in the tip 20 by blending or any other conventional method. Some cracks might not be repairable. For example, it may be desirable not to repair radial tip 20 cracks within about 20 mils outboard of the top row of cooling holes. Also, it might not be desirable to perform repairs that expose any internal cavities of the blade 18. Some blades 18 with tip 20 wall thickness below a specified minimum, for example about 15 mils may not be repairable with techniques presently available.

The trailing edge 22 also may be inspected for cracks. Depending on the particular blade 18, it may be possible to blend trailing edge 22 cracks up to about 50 mils and still perform the repair of the present invention. Blades 18 with trailing edge 22 cracks larger than a particular dimension, for example about 50 mils, may be repairable with a convention repair that includes removal of the bond coat 12 in addition to the ceramic top coat 18.

If the tip 20 has radial tip cooling holes, the holes may be prepped by routing out the radial tip cooling holes to remove oxidized material and dirt before restoring the tip 20. The tip 20 itself may be restored to predetermined dimensions by applying any filler material compatible with the blade's 18 base material. For example, a filler material with a nominal composition of Co-20Cr-15Ni-9.0W-4.4Al-3.0Ta-1.1Hf-0.2Ti-0.04Y-0.35C may be appropriate to use with a blade 18 that has a nominal composition of Ni-5.0Cr-10Co-1.9Mo-5.9W-3.0Re-8.7Ta-5.65Al-0.10Hf. The filler material is further described in expired U.S. Pat. No. 4,078,922 to Magyar et al., which is incorporated by reference. One skilled in the art will be able to select appropriate filler material based on the blade's 20 base material and engine operating environment. The filler material may be applied with any method that uses minimal heat input to minimize intermixing between the filler material and bond coat 12 to limit cracking and coating damage. One suitable method is variable polarity TIG welding with any suitable conventional parameters. Preferably, the variable polarity cycle welding will use a ratio of negative current to positive current of about 70:30 to about 90:10 and have a frequency of about 10 Hz to about 1000 Hz. A suitable method is described in commonly assigned U.S. Pat. No. 5,686,001 to Wrabel and Draghi, which is incorporated by reference in its entirety. Once the tip 20 has been restored, it may be desirable to stress relieve the blade 18 using any conventional stress relief technique to remove residual welding stresses. For example, the blade 18 may be heated to between about 1950° F. to about 2000° F. in a non-oxidizing atmosphere (e.g., vacuum or argon) for about 7 minutes to about 240 minutes. The tip 20 may then be machined to a predetermined length and the airfoil's 4 contour in the tip 20 area may be restored. As is known in the art, a small amount of excess filler material, for example up to about 10 mils, may be left around airfoil's 4 contour.

The restored tip 20 may be inspected with techniques that include, but are not limit to, fluorescent penetrant inspection to determine the presence of cracks, x-ray inspection to determine the presence of cracks and internal weld defects, and any other appropriate conventional method. The inspection criteria for the tip 20 depend on the particular blade 18 being repaired. In some case, it may be permissible for the tip 20 to have an unlimited number of cracks up to about 30 mils in length and up to three span-wise cracks of no more than about 80 mils in length as long as the cracks are separated by at least about 187.5 mils, are not in line, and do not extend over the tip 20. Blades 18 that do not meet the inspection limits may be repaired with an additional welding and stress relief step, as necessary. Depending on the specific blade 18, certain parts of the blade 18, such as the part of the trailing edge 22 near the tip 20 may not be re-welded.

After the tip 20 has been restored, a metallic flash coat should be applied over the bond coat 12 by conventional techniques. The flash coat of the present invention may be any metallic material known in the art that can form a durable bond between the blade 18 and ceramic top coat 16. Such materials typically comprise sufficient Al to form an adherent layer of aluminum oxide that provides a good bond with the ceramic top coat 16. For example, the flash coat may comprise a diffusion aluminide, including an aluminide that comprises one or more noble metals; an alloy of Ni and Al; or an MCrAlY, wherein the M stands for Fe, Ni, Co, or a mixture of Ni and Co. As used in this application, the term MCrAlY also encompasses compositions that include additional elements or combinations of elements such as Si, Hf, Ta, Re or noble metals as is known in the art. The MCrAlY also may include a layer of diffusion aluminide, particularly an aluminide that comprises one or more noble metals. Preferably, the flash coat will comprise an MCrAlY of the nominal composition Ni-22Co-17Cr-12.5Al-0.25Hf-0.4Si-0.6Y. This composition is further described in commonly assigned U.S. Pat. Nos. 4,585,481 and Re 32,121, both to Gupta et al., both of which are incorporated by reference.

The flash coat may be deposited by any method known in the art for depositing such materials. For example, the flash coat may be deposited by low or reduced pressure plasma spray (LPPS or RPPS), air plasma spray (APS), electron beam physical vapor deposition (EB-PVD), electroplating, cathodic arc, pack aluminide, overpack aluminide, or any other method. Preferably, the flash coat will be applied by LPPS. The flash coat should be applied to the blade 18 to a thickness sufficient to provide a strong bond between the blade 18 and ceramic top coat 16 and to prevent cracks that develop in the ceramic top coat 16 from propagating into the blade 18. For most applications, the flash coat may be about 1 mil to about 4 mils thick. Preferably, the flash coat will be at least about 1 mil thick to provide oxidation resistance and a suitable ceramic bond layer and to limit coat down. After depositing the flash coat, it may be desirable to peen the flash coat to close porosity or leaders that may have developed during deposition or to perform other mechanical or polishing operations to prepare the flash coat to receive the ceramic top coat 16. For example, the flash coat may be peened with a gravity assist shot peening method or any other peening method and finished with a ceramic or other media finishing method.

Following deposition of the flash coat, it may be desirable to rework any cooling holes that become partially or fully plugged with the coating. This may be done with any conventional method, such as grit blasting, electro-discharge machining (EDM) or any other suitable method.

Once the flash coat has been applied, the abrasive tip may be reapplied, if necessary. Any abrasive tip known in the art may be used. Several options include transient liquid phase-bonded (TLP) tip caps, sprayed abrasive tips or electroplated cubic boron nitride (cBN) tips. A tip cap typically comprises a superalloy "boat" filled with an abrasive grit and metal matrix. The abrasive grit may be silicon carbide, silicon nitride, silicon-aluminumoxynitride (SiAlON) and mixtures of these materials. The metal matrix may be a Ni, Co, or Fe base superalloy that includes a reactive metal such as Y, Hf, Ti, Mo, or Mn. The "boat" is bonded to the tip of the blade 18 using transient liquid phase bonding techniques. Tip caps and the transient liquid phase bonding technique are described in commonly assigned U.S. Pat. Nos. 3,678,570 to Paulonis et al., 4,038,041 to Duval et al., 4,122,992 to Duval et al., 4,152,488 to Schilke et al., 4,249,913 to Johnson et al., 4,735,656 to Schaefer et al., and 4,802,828 to Rutz et al. A sprayed abrasive tip typically comprises aluminum oxide coated silicon carbide or silicon nitride abrasive grits surrounded by a metal matrix that is etched back to expose the grits. Such tips are described in commonly assigned U.S. Pat. Nos. 4,610,698 to Eaton et al., 4,152,488 to Schilke et al., 4,249,913 to Johnson et al., 4,680,199 to Vontell et al., 4,489,242 to Pike, 4,741,973 to Condit et al., and 4,744,725 to Matarese et al. An electroplated cBN abrasive blade tip typically comprises a plurality of cBN grits surrounded by an electroplated metal matrix. The matrix may be nickel, MCrAlY, where M is Fe, Ni, Co, or a mixture of Ni and Co, or another metal or alloy.

After the abrasive tip is reapplied, any radial tip cooling holes should be reinstalled. These holes may be formed by any conventional technique, for example laser, electro-discharge machining, or other method, to specifications established by the manufacturer or regulatory agency.

Next, the ceramic top coat should be applied. The aluminum oxide layer 14, sometimes referred to as thermally grown oxide, may be formed on the flash coat by any method that produces a uniform, adherent layer. For example, the layer 14 may be formed by oxidation of Al in the flash coat at an elevated temperature before the application of the ceramic top coat 16. Alternately, the aluminum oxide layer 14 may be deposited by chemical vapor deposition or any other suitable deposition method known in the art. The thickness of the aluminum oxide layer 14 may vary based its density and homogeneity. Preferably, the aluminum oxide layer 14 will about 0.004 mils to about 0.4 mils thick.

The ceramic top coat 16 may comprise a mixture of zirconium oxide and a stabilizer such as yttrium oxide ($Y_2O_3$), magnesium oxide (MgO), calcium oxide (CaO), or a mixture thereof. Yttrium oxide is the preferred stabilizer. The ceramic top coat 16 should include enough stabilizer to prevent an undesirable zirconium oxide phase change (i.e. a change from a preferred tetragonal or cubic crystal structure to the less desired monoclinic crystal structure) over the range of operating temperature likely to be experienced in a particular gas turbine engine. Preferably, the ceramic top coat 16 will comprise a mixture of zirconium oxide and about 3 wt % to about 25 wt % yttrium oxide. Most preferably, the zirconium oxide abrasive coat will comprise about 6 wt % to about 8 wt % yttrium oxide or about 11 wt % to about 13 wt % yttrium oxide, depending on the intended temperature range.

The ceramic top coat 16 may have a plurality of columnar segments homogeneously dispersed throughout the abrasive coat such that a cross-section of the abrasive coat normal to the surface to which the top coat 16 is applied exposes a columnar microstructure typical of physical vapor deposited coatings. The columnar structure may have a length that extends for the full thickness of the ceramic top coat 16. Such coatings are described in commonly assigned U.S. Pat. Nos. 4,321,310 to Ulion et al., 4,321,311 to Strangman, 4,401,697 to Strangman, 4,405,659 to Strangman, 4,405,660 to Ulion et al., 4,414,249 to Ulion et al., and 5,262,245 to Ulion et al., all of which are incorporated by reference. A columnar ceramic top coat 16 may be deposited by E B-PVD or any other physical vapor deposition method known to deposit columnar coating structures. Preferably, the ceramic top coat 16 of the present invention will be applied by EB-PVD because of the availability of EB-PVD equipment and skilled technicians. The ceramic top coat 16 should be applied a thickness sufficient to provide a strong bond with the surface to which it is applied.

For most applications, the top coat 16 may be about 5 mils to about 50 mils thick. Preferably, the top coat 16 will be about 5 mils to about 25 mils thick.

In some applications it may be desirable apply the ceramic top coat 16 using a thermal spray method such as LPPS or APS. Coatings applied by this method will have a porous structure rather than the columnar structure described above.

Following deposition of the ceramic top coat 16, the blade 18 may be finished by a series of steps know in the art. These may include:

precipitation heat treatment as known in the art for the material from which the blade 18 is made. For example, the heat treatment may be performed in an air, vacuum, argon, helium, or hydrogen, as appropriate, at temperatures between about 1275° F. and about 1625° F. for about 8 hours to about 32 hours.

root 24 shot peening internal cavity x-ray inspection to ensure there are no residual peening media in the cavity water flow inspection to ensure internal passages are free from obstruction airflow inspection to ensure blade cooling passages are free from obstruction and cooling holes are correctly metered.

Other steps known in the art may be included as necessary.

The invention is not limited to the particular embodiments shown and described in this application. Various changes and modifications may be made without departing from the spirit or scope of the claimed invention. For example, the method of the present invention may be used on any gas turbine engine parts that have a multi-layer thermal barrier coating. One skilled in the art will recognize that the order of the steps is not critical and can be modified to suit any particular situation. Moreover, certain steps may be deleted in their entirety if they are not required for a particular part. For example, the steps that relate to restoring a blade tip 20, if there is no need to restore the tip 20 or the part being repair (e.g., a vane 2) does not have a tip.

We claim:

1. A method for repairing a gas turbine engine component coated with a thermal barrier coating that includes a metallic bond coat, an aluminum oxide layer on top of the bond coat and a ceramic top coat on top of the aluminum oxide layer, comprising the steps of:

(a) removing the ceramic top coat and the aluminum oxide layer from an engine-run gas turbine engine component, such that at least about 1 mil of the bond coat, remains on the component;

(b) inspecting the component to determine if it meets predetermined minimum standards, including that the component does not display any base metal oxidation;

(c) applying a metallic flash coat to at least a portion of the component;

(d) forming a new aluminum oxide layer on the flash coat; and (e) applying a new ceramic top coat over predetermined portions of the component, including the portion to which the metallic flash coat was applied.

2. The method of claim 1, further comprising cleaning an internal cavity of the gas turbine engine component after step (a) and before step (b) or after step (b) and before step (c).

3. The method of claim 1, wherein the gas turbine component includes a plurality of cooling holes and further comprising redrilling cooling holes at any point after step (c) to meet predetermined air flow requirements.

4. The method of claim 1, wherein the metallic flash coat is about 1 mil to about 4 mils thick.

5. The method of claim 1, wherein the gas turbine component is a blade having a tip coated with an abrasive material and further comprising after step (b) and before step (c) the steps of:

(ba) removing the abrasive material from the tip of the blade; and (bb) applying weld material to the tip to restore the tip to a predetermined dimension and after step (c) and before step (d) the step of:

(ca) applying abrasive material to the blade tip.

6. The method of claim 5, wherein step (bb) is performed with minimal heat input to minimize intermixing between the weld material and metallic bond coat.

7. The method of claim 6, wherein step (bb) is performed with variable polarity TIG welding.

* * * * *